(No Model.)
C. V. ROBERTS.
FISHING LINE REEL.
No. 328,341. Patented Oct. 13, 1885.
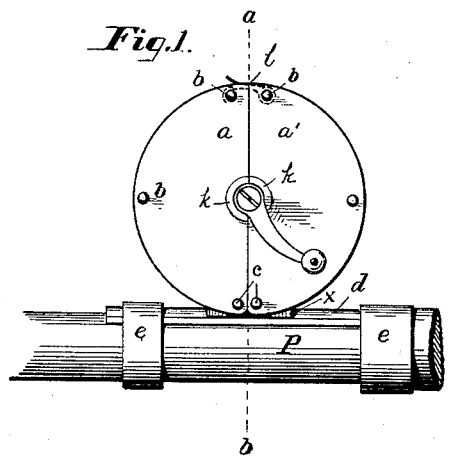
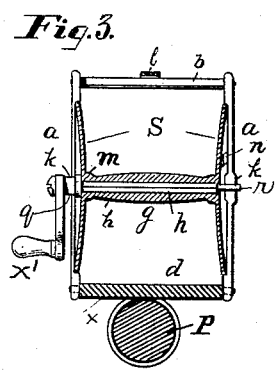
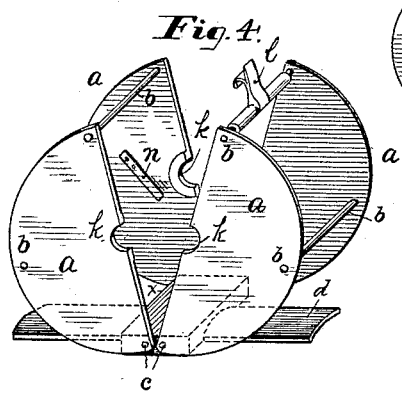
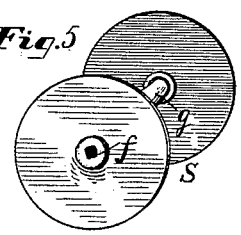
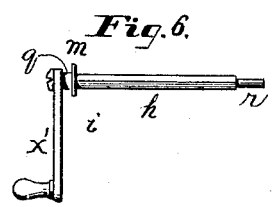
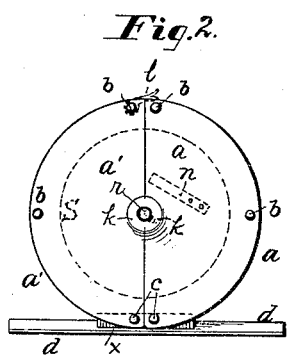
WITNESSES:
John Nolan
N Henlow
INVENTOR
Clarence V. Roberts,
per Joshua Pusey, atty.

UNITED STATES PATENT OFFICE.

CLARENCE V. ROBERTS, OF PHILADELPHIA, PENNSYLVANIA.

FISHING-LINE REEL.

SPECIFICATION forming part of Letters Patent No. 328,341, dated October 13, 1885.

Application filed November 25, 1884. Serial No. 148,792. (No model.)

*To all whom it may concern:*

Be it known that I, CLARENCE V. ROBERTS, a citizen of the United States, residing at the city and county of Philadelphia, and State of Pennsylvania, have invented certain new and useful Improvements in Fishing-Line Reels, of which the following is a full, clear, and exact description, reference being had to the accompanying drawings, of which—

Figure 1 is a side elevation of a fishing-reel embodying my invention. Fig. 2 is a like elevation of the same, looking at the side opposite Fig. 1. Fig. 3 is a section as on the line $a\,b$, Fig. 4. Fig. 4 is a perspective view of the hinged frame partially opened, the spool being detached and represented in perspective in Fig. 5. Fig. 6 is a side view of the crank and shaft of the spool detached.

Like letters of reference always indicate the same parts.

The nature of this invention is a fishing-line reel of such construction that the spool upon which the line is wound may be readily removed from the frame in which it is adapted to rotate, and another spool as readily substituted therefor. Its object is to enable fishermen to readily change from one size or other character of line to another without running off one line from the reel and winding another upon the same, as has heretofore been the general practice.

The preferred construction of the invention is as follows. Its scope will be pointed out in the claim. I usually make the reel-frame in two parts, $a\,a'$, the corresponding opposite parts or halves being connected rigidly together by the usual rods, $b$. These parts $a\,a'$ are pivoted, respectively, at $c\,c$ to a projection, $x$, of the plate $d$, which, in connection with the sliding sleeves or ferrules $e$, serves to secure the reel to the pole P, Figs. 1 and 2.

S is the spool upon which the line is to be wound. It is preferably dish-shaped, as shown, and its width between the heads is such that it will fit loosely within the sides of the reel-frame, as in Fig. 3.

A rectangular or other suitable shaped aperture, $f$, passes through its axis $g$ for the reception of the correspondingly-shaped part $h$, Figs. 3 and 6, of the detachable crank-shaft $x'$, whereby the turning of the crank will rotate the spool. The object in making the crank-shaft detachable is to enable a single crank to be used with the various spools.

In inserting the spool S within the reel-frame the separable parts of the latter are opened out to a sufficient extent to permit the heads of the spool to pass between the two upper ones of cross-bars $b$ on opposite sides of the line of separation, and the crank-shaft having been inserted in the aperture $f$ in the spool the free circular end $r$ of the shaft is laid in one of the bearings $k$ of the heads of the reel-frame, and the round part $q$ of the shaft next the crank is laid in the bearing at the other head of the reel-frame, as in Fig. 2. The two parts $a\,a'$ are then closed together and secured by means of a catch, $l$, that is pivoted on one of the upper transverse bars, $b$, and springs over the corresponding cross-bar on the opposite half of the frame.

I prefer to provide the crank-shaft with a collar, $m$, Figs. 3 and 6, which, bearing against the inner side of one of the reel-heads, prevents said shaft from escaping, as will be clearly understood by referring to Fig. 3.

In order to keep the spool from rotating too freely, and thus allowing the line to unreel when not desirable, I bring to bear upon the side of one of its heads a spring, $n$, which is secured preferably on the inside, as shown in Figs. 3 and 4, and indicated by the broken lines in Fig. 2. In this case, however, I dispense with collar $m$, and in order to retain the shaft in its socket or aperture $f$, I make the same slightly tapering or a close fit within the said socket, so that when it—the shaft—is pushed in it will require some force to overcome the friction and enable the shaft to be drawn out.

Having thus described my invention, I claim as new and desire to secure by Letters Patent—

The combination, with the base-plate which is attached to the rod, of the reel-frame constructed in two parts and hinged to the said base-plate, the detachable spool having a square opening extending through it, the crank-shaft extending through the spool, and the collar thereon for locking the spool on the
5 shaft, and the clasp by means of which the parts of the spool-frame are locked together, substantially as specified.

In testimony whereof I have hereunto affixed my signature this 20th day of November, A. D. 1884.

CLARENCE V. ROBERTS.

Witnesses:
JOHN NOLAN,
ANDREW ZANE, Jr.